May 3, 1966   J. J. JARNAGIN   3,248,795
ELAPSED TIME LIQUID LEVEL TELEMETERING DEVICE
Filed Oct. 5, 1961   3 Sheets-Sheet 1
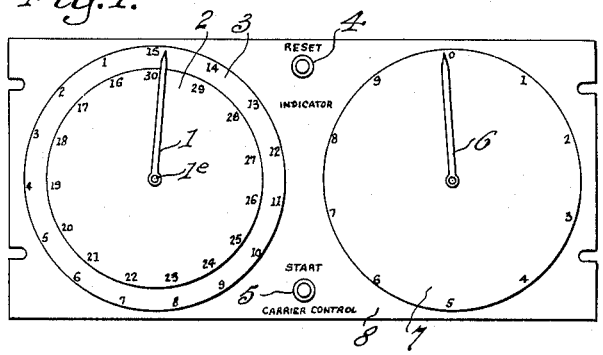
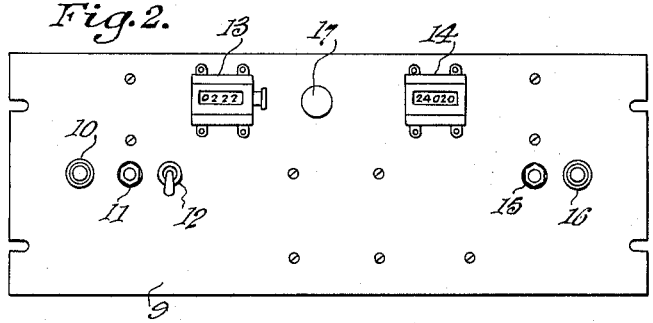
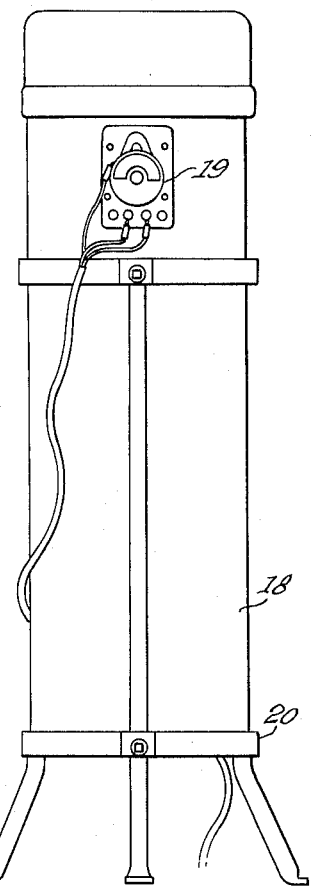
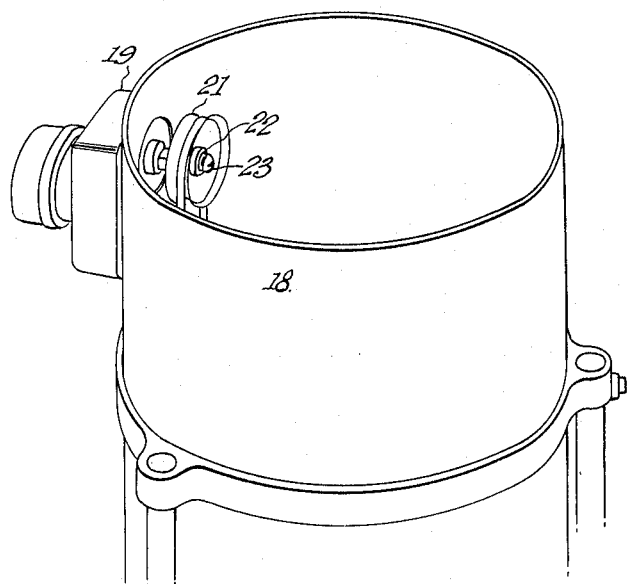
INVENTOR.
Joseph J. Jarnagin
BY George F. Westerman
Bonifant Hamilton
ATTORNEYS

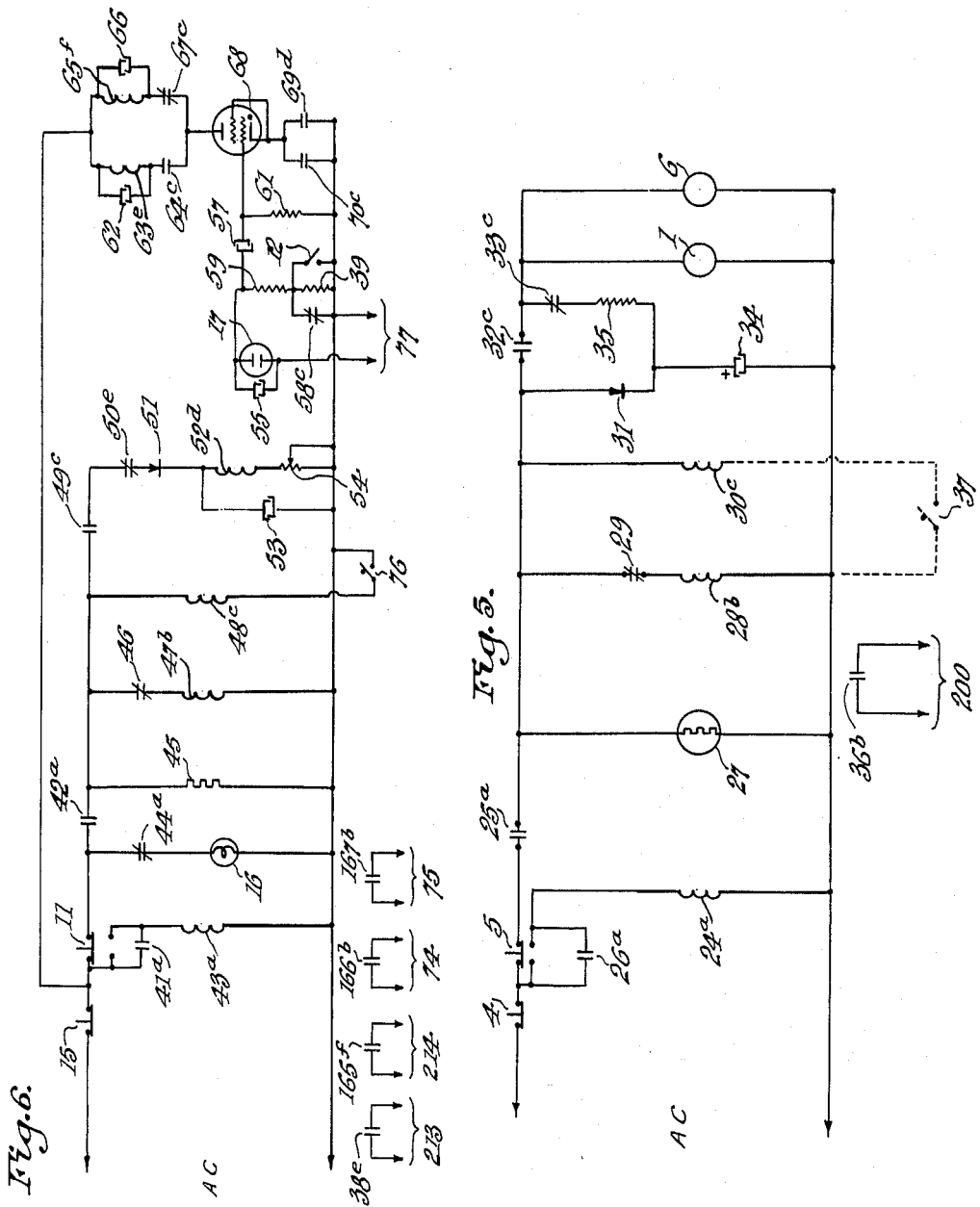

May 3, 1966 J. J. JARNAGIN 3,248,795
ELAPSED TIME LIQUID LEVEL TELEMETERING DEVICE
Filed Oct. 5, 1961 3 Sheets-Sheet 3
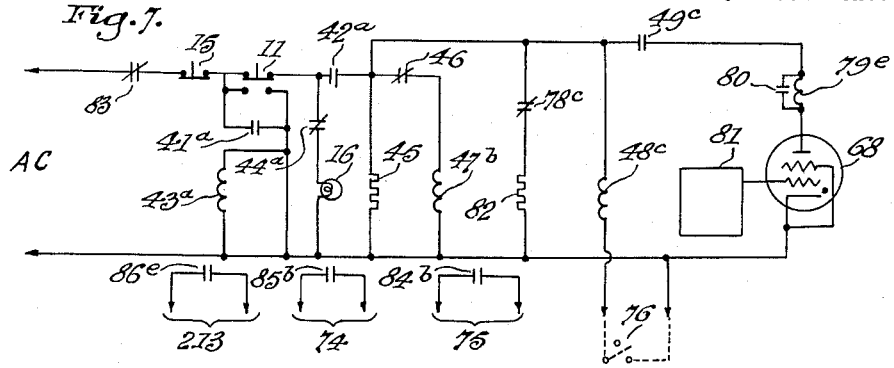
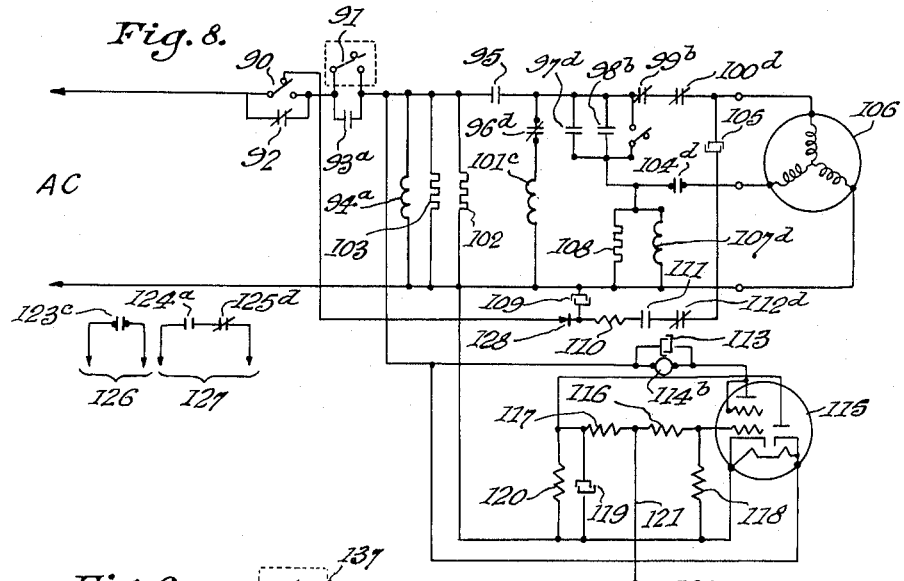
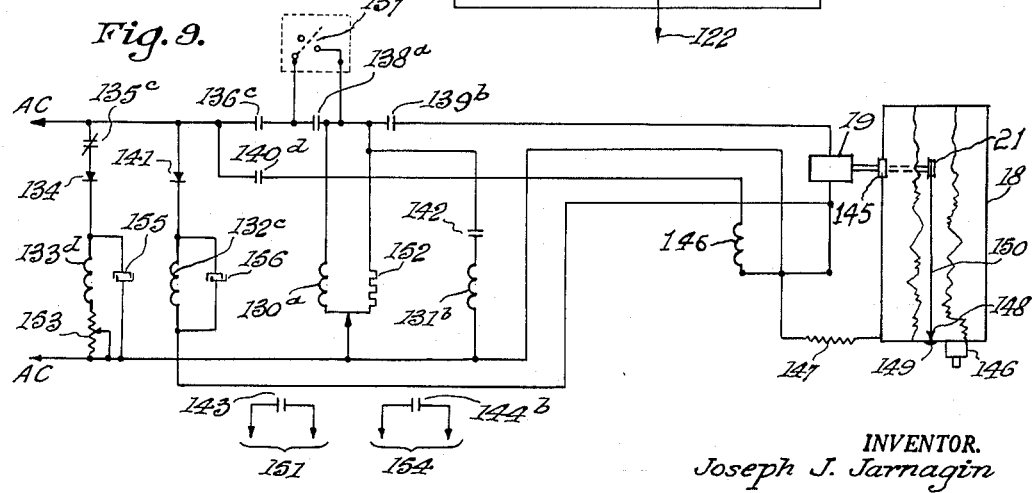
INVENTOR.
Joseph J. Jarnagin
ATTORNEYS United States Patent Office 3,248,795
Patented May 3, 1966

3,248,795
ELAPSED TIME LIQUID LEVEL TELEMETERING DEVICE
Joseph J. Jarnagin, 6910 Green Manor Drive, Louisville, Ky. 40228
Filed Oct. 5, 1961, Ser. No. 143,258
4 Claims. (Cl. 33—126.6)

The invention described herein may be manufactured and used by or for the Government for governmental purposes without the payment of any royalty thereon.

This invention relates to the art of rain and water measurements and of telemetering and provides for a system and apparatus for transmitting measurements of liquid levels by means of wire or radio to a central control station.

Liquid level telemetering devices are commonly used for reporting purposes among agencies concerned with control, prevention, reporting, and study of floods and in the study and reporting of navigation and weather conditions. Water levels, tide levels and precipitation amounts are collected at various critical points and transmitted to a central station where these reports are collated, evaluated and disseminated.

It is the object of this invention therefore to secure remote stream and rain gauge readings, and to transmit such information by means of wire or radio, to telemetering gauge stations.

It is a further object of this invention to provide a device, simple of construction, of operation, and of maintenance, as well as inexpensive to construct and to operate.

Another object of this invention is to provide a fluid level telemetering system which is easily handled and stored, yet accurate in operation.

Another object of this invention is to provide, in a device of the type described above, a new mechanical measuring means and a new electrical data transmission means.

Briefly, this system comprises at a measuring site: communication reception and water level measuring means as well as conventional wire or radio transmission means equipped with conventional carrier and tone generation equipment; and at an interrogation control center: equipment for carrier and tone frequency generation, control means for keying the carrier and tone generator communication reception means and elapsed time recording equipment.

One complete rain measurement system has at the measuring site, a tank with a motor driven traveling probe, a receiver including a tone control relay, which upon actuation from the central control point, operates the probe motor to raise the probe through the depth of water to the water surface. Tone generation then starts which, when received at the control center, switches the supply on the recording motors from D.C. to A.C. Subsequently, when the probe has broken the surface of the water and the tone has stopped, the supply to the recording motors is again reversed from A.C. to D.C. thus stopping the motors the instant the signal from the tone receivers at the measuring site is lost. In one embodiment of the interrogation center, there is a counting system including an oscillator connected to a thyratron. A circuit is provided for changing the rate of frequency of the oscillator which in turn changes the rate of firing or conduction of the thyratron. A keying relay for operating the thyratron cooperates with the tone control relay in the receiver at the measuring site. Thus the oscillator, with counters, affords measurements in units of ten or one hundred depending on whether stream or rain measurements are being taken. Control centers include both dial measurement systems and counting systems.

In the stream water level detector, an electronic tube combines a half-wave rectifier and an amplifier so connected that the output of the rectifier portion is applied to bias the grid of the amplifier portion causing the tube to cut off and to be in a nonconducting condition. A relay controlling the output of the amplifier, will have been energized, prior to the cutoff of the tube, thus keying the transmitter and tone generator for a time determined by a time delay relay. The probe, connected to the grid of the amplifier, upon touching the water removes the bias from the grid of the amplifier, thus permitting the tube to conduct, this in turn actuating relays to discontinue keying the transmitter carrier and tone generator, and to reverse the probe motor. When the probe reaches the home position D.C. is applied to the probe motor to insure instant positive stop at the home position and, shortly thereafter, the D.C. is removed from the motor by elements of the control circuit.

Detailed operation and further advantages of this invention will be better understood from the following detailed description thereof when read in conjunction with the accompanying drawings in which:

FIG. 1 is a front view of the dial-type interrogation control panel;

FIG. 2 is a front view of a counter-type interrogation control panel;

FIG. 3 is a side view of a rain gauge used at the measuring site;

FIG. 4 is a perspective view showing the top of the rain gauge shown in FIG. 3;

FIG. 5 is a circuit diagram of the dial-type interrogation control panel shown in FIG. 1;

FIG. 6 is a circuit diagram of the counter-type interrogation control panel as shown in FIG. 2;

FIG. 7 is a circuit diagram of a simplified version of the species depicted in FIG. 6;

FIG. 8 is a circuit diagram of an elapsed time stream water level detector used at the measuring site; and FIG. 9 is a circuit diagram of an elapsed time precipitation telemetering device for use at the measuring site.

Referring in more detail to FIG. 1, the gross indicator 1 is secured to the axle of a 4 r.p.m. synchronous clock motor of the spring rewind type which is normally used for time delay. The motor turns counterclockwise and the indicator reads on the inches dial 2 for rain measurement and on the feet dial 3 for stream depth measurements. The sensitive dial 7 on the right of the control panel 8 is marked in tenths of the units measured by inches dial 2 or the feet dial 3. It is normally used in measuring fractions of feet when the panel is measuring stream depth and is normally ignored when rain depth in inches is being measured, except when finite accuracy is required. The sensitive indicator 6 is secured to the axle of a 60 r.p.m. synchronous clock motor and may be set at zero manually. Also included on the face of the interrogation control panel 8 is a reset button 4 and a carrier control starter button 5, detailed function of which will be included in the explanation of FIG. 5 below.

FIG. 2 depicts a front view of the interrogation counter-type control panel 9. Included on the panel generally from left to right is a filament transformer line voltage pilot lamp 10 which indicates the line voltage taken off of the filament transformer for tube 68 described below under FIG. 6. To the right of pilot lamp 10 is starter button 11 and the oscillator frequency change toggle switch 12. The unit reset counter 13 is the full unit counter of this embodiment. The oscillator light 17, between the counters, indicates that the oscillator is working and its frequency of oscillation. The fraction counter 14 is a conventional nonreset type counter. To the right of fraction counter 14 is manual reset button 15, and ready light 16 indicates that the unit is ready for use.

A counter 13 appropriate for this embodiment of the control panel has a twelve volt D.C. coil and is powered by a filament transformer using a selenium full wave rectifier. The aforementioned transformer is 12 volt, center tapped, connected on one side of the center tap to the filament of tube 68 (FIG. 6), and the full winding to the rectifier to power the counter. A full explanation of the detailed working of the face of the interrogation control panel 9 is included in the explanation of the circuit diagram depicted by FIG. 6.

FIGS. 3 and 4 depict in detail the rain gauge 18 resting in stand 20 showing the side mounted probe motor 19 which, in this embodiment is a 1 r.p.m. synchronous clock timer motor, the shaft for which has been extended for the mounting of pulley 21 which is held in place on sleeve shaft 22 by screw 23. Probe 148 (FIG. 9) utilized in this embodiment (not shown in FIG. 3 or 4) is an elongated solid metallic pointed object of approximately the size of a ten-penny nail. It is secured to and suspended by a stainless steel wire of the type generally used in wire recording, and is raised and lowered by the winding and unwinding of the wire, the free end of which is secured on pulley 21. The shaft of probe motor 19 (which, in the embodiment depicted, is a General Electric 5-minute timer No. CR2820–1736A2, modified as described above) is designed for a rise of the probe of one-tenth of an inch per second. Probe 148 is normally in contact with the bottom of the container except when measurement is being made, and the probe is in motion. Electrical contact when the probe is at rest at the bottom of the container is insured by having a depression 149 (FIG. 9) at the bottom of the container at the point of contact of the probe, which depression is filled with mercury to level with the bottom of the container. Included in the timer mechanism is a spiral wheel which acts as a stop limit on the motor, permitting exact adjustment of the probe and limiting the end travel. The timer switch of the motor is not utilized in the instant embodiment but may be incorporated as an upper limit means in the event of improper function of the probe or, when the container is tilted or overflowing with water, to stop the timer mechanism.

The stream gauge probe 122, not shown in the drawings, but depicted schematically in the circuit diagram of FIG. 8, is a probe similar to that described for the rain detector, also suspended by stainless steel wire, which is raised and lowered by a pulley operated by a 200 r.p.m. capacity start and synchronously running motor. A grooved brass shaft may be utilized for winding the wire in order to prevent overlapping of the wire, thus furnishing more accurate readings. The size of shaft and the weight of the probe is designed in the instant embodiment for a fall of one foot-per-second.

FIG. 5 depicts the elapsed time indicator and interrogation control system designed to operate in conjunction with the stream level detector shown at FIG. 8 and the rain measuring unit at FIG. 9. When spring loaded starter button 5 is depressed, relay coil 24a is energized and contacts 25a and 26a are closed (coil 24a and contacts 25a and 26a being part of one relay). So long as the starter button 5 is held down or depressed, the line leading to contact 25a is open, as a result of which no further action takes place within the device except the energizing of the aforesaid relay. Upon release of starter button 5, the time delay relay comprising heater 27 (a two-second thermo delay relay Amperite type 115 NC 2) and normally closed time delay switch 29 is energized. Coil 28b is also energized for a period of two seconds and contact 36b (on coil 28b) keys the tone generator and transmitter (through leads 200) which is used in conjunction with this device (but not shown) for a time equal to the two second delay of the time delay contacts. At this time D.C. voltage is present in the windings of the motors of indicators 1 and 6, having been converted thereto by selenium rectifier 31 and passing from said rectifier through the resistor 35, through normally closed contact 33c of relay coil 30c to the motors of indicators 1 and 6. Upon receiving a signal from the measuring site, tone generator controlled switch 37 closes and coil 30c is energized, contact 32c of coil 30c closes and contact 33c of coil 30c opens thus placing 60 cycle A.C. current on the windings of the indicator motors, at the same time disconnecting the source of the D.C. current. Thus, during the reception of the signal from the measuring site, the tone generator controlled switch 32 remains closed and indicators 1 and 6 measure, in terms of depth of the water, the time of receipt of the signal from the measuring site. When the signal stops, the tone generator controlled switch 37 opens, de-energizing relay coil 30c and opening contact 32c while closing contact 33c of relay coil 30c. Thus the windings of the clock motors driving indicators 1 and 6 are again deprived of A.C. current, the substituted D.C. voltage acting as a brake to stop the motors instantly. As mentioned above, the motor of gross indicator 1 is of the spring rewind type in order that it may be reset electrically simply by removing the direct current voltage on the windings. This is done by pressing the reset button 4, the action of which also de-energizes relay coil 24a. As mentioned in the explanation of FIG. 1, the motor of sensitive indicator 6 is reset manually only. Condenser 34 is a twenty mf., 150 volt type. Resistor 35 is rated at 3K ohms and ten watts.

FIG. 6 shows in detail the circuit diagram of the interrogation counter-type control panel, the front of which is shown at FIG. 2. It will be noted that this device serves the same purpose as the control system shown at FIG. 5, except that the reading of depth is in digits rather than in dial form and, of course, may be read with greater ease. This control system is designed to operate in conjunction with the measuring circuits shown in FIGS. 8 and 9. The similarity of operation between this system and the system depicted by FIG. 5 is apparent. The same general method is used for keying the carrier and tone generator and for energizing relay coil 48c which, of course, corresponds with relay coil 30c of FIG. 5. It should also be noted at the outset that the oscillator circuit shown in this preferred embodiment is very elementary and it is contemplated that more complex and practical oscillators or pulsers may easily be incorporated into this system. Pilot light 16 through closed contact 44a is on prior to operation. When starter button 11 (a spring loaded starter button) is depressed, coil 43a is energized and contacts 41a and 42a are closed while contact 44a is opened, the last cutting off pilot light 16. So long as starter button 11 is depressed, the main circuit is broken and nothing further takes place. When the starter button is released, the two-second time delay heater 45 begins its cycle at the conclusion of which time delay switch 46, operating on heater 45, will open. Coil 47b is energized which in turn closes the two contacts 166b and 167b located thereon and shown below which keys a carrier (not shown) and a tone generator (not shown) operating in conjunction with this control system through leads 74 and 75, respectively. When the tone generator controlled switch 76, located in the receiver used in conjunction with this system is closed on receipt of a signal from the measuring site, coil 48c is energized which closes contact 49c and opens contacts 67c and 58c. As contact 49c closes, coil 52d is energized by the current passing through normally closed contact 50e. Also as coil 48c is energized, it will be noted that as contact 64c (on coil 48c) is closed and as contact 67c is opened that coil 63e is placed in the plate circuit of thyratron tube 68. Upon the energizing of coil 48c, contact 70c has closed the cathode circuit. It will be noted that as coil 63e is placed in the circuit, the full unit counter 13 (not shown) on leads 213 operating from the relay contact 38e of which coil 63e is a part, is set in motion and commences the count.

When the tone is lost, the tone control relay 76, located in the receiver, opens and coil 48c is de-energized, which in turn opens contacts 49c, 64c and 70c, at the same time closing 67c and 58c, shunting resistor 39 with the normally closed contact 58c and increasing the frequency of the oscillator. At the same time, the circuit of normally open contact 70c is removed from the cathode circuit of thyratron tube 68. Coil 63e (operating full unit counter 13, not shown, through contact 38e) is removed by contact 64c (on coil 48c) and coil 65f (operating digit counter 14, not shown, through contact 165f) is added by contact 67c (on coil 48c) thus continuing the count at ten cycles per second on the digit counter 14 (not shown) through leads 214 until relay coil 52d, a SPDT 5K ohm D.C. relay coil times out in .9 second and opens the cathode of thyratron tube 68. On each energization of coil 63e, the voltage to delay circuit coil 52d is keyed thus charging the capacitor 53 to hold for another .9 second. The variable resistor 54 paralleled with condenser 53 is the adjustment for this circuit. The fraction count on the digit counter 14 (leads 214) will increase according to the length of time that coil 52d holds contact 69d closed keeping the cathode circuit of thyratron tube 68 closed after coil 48c has been de-energized and contact 70c has returned to the open position. The digit counter 14 (leads 214), during this period of time, will be indicating in tenths and hundredths for stream and rain depth, respectively. With respect to the digit counter, it should be noted that in this embodiment, the counter works in reverse for direct reading, that is to say, from 10 to 0. Further, with respect to the circuit diagram shown in FIG. 6, it should be noted that coil 52d, being a D.C. relay, requires the presence of selenium rectifier 51 between the aforesaid coil and contact 50e. Condensers 62 and 66 are .25 mf. condensers, as is condenser 55. Condenser 57 is a .01 mf. condenser. The heater (not shown) for thyratron tube 68 is a 6.3 volt heater operating off of the A.C. line. It should be noted with respect to this circuit that the digit or fraction counter and its associated components may be entirely eliminated leaving only the full unit counter reading in tenths and one-hundredths (for stream and rain, respectively). Toggle switch 12 may be used to change the frequency of oscillation of the oscillator. Thus, with the toggle switch in the open position, the full unit counter will be indicating in feet and the digit counter will be indicating in tenths of feet when measuring stream depth, and these indicators would, with the toggle switch in this position, be indicating in tenths and one-hundredths of inches, respectively, when measuring rain depth. With toggle switch 12 in the closed position, the full unit counter will be measuring in tenths of feet of stream depth and one-hundredths of inches of rain depth while, at the same time, the digit counter will be measuring in terms of one-hundredths of feet when measuring stream depths and a fraction so delicate as to be ignored when measuring rain depth. This follows from the inclusion or exclusion of the resistor 39 in the circuit (with resistor 59) as the toggle switch 12 is opened or closed, respectively. The frequency of oscillation of the oscillator (power for which is supplied through leads 77), is made apparent on the face of the control panel 9 by the flashing of oscillator light 17 which has a standard neon bulb. Resistor 61, in the oscillator circuit, is for providing grid bias.

FIG. 7 is a simplified version of the system described in FIG. 6 with the digit counter 14 and its associated components eliminated. When units other than 1/10 of an inch for stream measurement and 1/100 of an inch for rainfall are desired, the unit measurement may be altered by changing the frequency of the oscillator connected to the thyratron tube. The circuit shown in FIG. 7 is, like that of FIG. 6, designed to operate in conjunction with the apparatus shown at FIGS. 2 and 3. It will be noted that the labeling of this circuit diagram is, for the most part, identical with that of FIG. 6. These elements have been so labeled where their structure and function is the same as in FIG. 6. The push button starter 11 works in the same manner as in FIG. 6 to energize coil 43a and, upon release thereof, to apply current to time delay heater 45 and coil 47b. Coil 47b keys the carrier through leads 74 and the tone generator through leads 75 through contacts 85b and 84b in the same manner as above. When the tone control relay 76 (located in a receiver used in conjunction with this invention) is closed by the reception of a signal in the receiver, coil 48c being thereby energized, opens contact 78c removing the voltage to the ten-second delay heater 82 which eventually opens the automatic reset contact 83. This ten-second delay time during which contact 83 is closed, must, of course, overlap the time of probe starting and the time of application of voltage to the thyratron tube 68 through the relay coil 79e for the counter 13 (not shown) through leads 213. In other words, the following measuring cycle takes place within the cooling period of heater 82. The closing of contact 49c, concurrent with the energizing of coil 48c, starts the ten cycle-per-second oscillator 81, which oscillator may also be left running free and not under the control of contact 49c. If the oscillator has been running free, the accuracy of the count may be affected plus or minus one, depending upon the part of the cycle that the oscillator is in at the instant contact 49c is closed. Contact 49c also, in closing sets in motion the digit counter 13 (not shown) through leads 213 and through contact 86e which contact operates in conjunction with coil 79e and .25 mf. condenser 80. When the tone is lost from the receiver and tone control switch 76 opens, coil 48c drops out and a hundred and ten volts is applied again through normally closed contact 78c to the heater 82. However, after the thermal time delay of contact 83 (of time delay heater 82), power is removed from coil 43a making the circuit ready for the next cycle of operation as soon as the heater 82 has cooled and its contact 83 has returned to the normally closed position. The drop out of coil 43a with normally closed contact 44a closes this circuit illuminating ready light 16. The counter utilized in this embodiment is an electromechanical four digit counter which may be operated from the plate or from a relay in the plate circuit of the thyratron 68.

Referring in detail to FIG. 8, the diagram is for an elapsed time stream water detector designed to work in conjunction with the control systems described in FIGS. 5, 6 and 7. The circuit described herein is located at the measuring site. Upon reception of tone generator signal by a receiver (not shown) from the control center, tone generator operated switch 91 closes and coil 94a is energized through normally closed time delay contact 92. This energizes the transmitter carrier (not shown) through leads 127 by the closing of contact 124a operating from coil 94a. Also energized are time delay heaters 102 and 103. Time delay heater 102 is a two-second time delay and in two seconds time delay contact 95, operating from time delay heater 102, closes, thus energizing coil 101c through normally closed contact 96d. The energizing of coil 101c keys the tone generator (not shown) through leads 126 through contact 123c operating from coil 101c. The closing of time delay contact 95 also starts the probe motor 106 which is a two-hundred r.p.m. capacitor start and synchronously running reversible motor. Time delays contact 92 operates from time delay heater 103 which is a five second delay unit. This five second delay carries the probe motor past the operation of limit switch 90 before timing out. The detailed operation of limit switch 90 will be explained below. As the probe motor is operating in forward motion, it drops the probe detector 122 suspended on the stainless steel wire 121 and, as the probe contacts the water surface, the bias of the grid in tube 115 is removed, which causes coil 114b to be energized, which, in turn, opens contact 99b and closes contact 98b (both contacts operated by coil 114b) to reverse the probe motor and energize coil 107d and time delay heater 108. Tube 115 is a standard diode-pentode operated as a diode-triode, the suppressor grid, not shown, in the pentode section being connected to the cathode. Energizing of coil 107d opens normally closed contact 96d thus dropping out coil 101c. And as coil 101c is dropped out, the tone generator, operating through contact 123c, also stops. Energizing of coil 107d also opens normally closed contact 125d to stop the transmitter carrier, concurrently closing contacts 97d and 104d and opening contact 112d. The return of the probe to home position keys limit switch 90 which is a switch of the snap action type, operated by the gear train driven by the probe motor. The gear train is a clock gear mechanism geared approximately 100 to 1. Switch 90 is actuated by a leaf lever on the said gear train. As limit switch 90 is thrown, a surge of D.C. voltage is applied to the windings of the probe motor 106 through the selenium rectifier 128 and contacts 111 and 112d. This surge of D.C. voltage is to insure an instant positive stop of the motor at the home position. Subsequently, the heater 108 will cool and thus remove the D.C. voltage through opening of time delay switch 111 operating therefrom. Contact 93a operates with coil 94a to maintain the operating circuit. Normally closed contact 100d is operated by coil 107d, as is contact 104d. Condenser 105 is a .9 mf. condenser. Condenser 109 is rated in this embodiment as 10 mf., and condenser 113 is of 10 mf. and 150 volts. Condenser 119 is a 20 mf. condenser. The following resistors in the circuit are rated as follows: reistor 116, 15 meg.; resistor 117, 15 meg.; resistor 118, 2 meg.; and resistor 120 10K ohms; and resistor 110 is at 1K ohm 10-watt resistor.

FIG. 9 is a schematic representation of a telemetering precipitation device for use at the measuring site and which may be worked in conjunction with the control systems described in FIGS. 5, 6, and 7. This circuit diagram is shown with no power applied. However, it will normally be assumed that coil 132c is always energized except when the probe is out of contact with water (including a situation where the bottom of the container is empty). When the tone generator controlled switch 137 is closed upon reception of the signal by a receiver (not shown) from the control system, coil 130a is energized as is time delay heater 152. Carrier keying through leads 151 is set in operation through the contact 143 operating from coil 130a. When time delay contact 142 times in operated by and after the 2-second delay of time delay heater 152, coil 131b is energized which in turn keys the tone generator (not shown) through leads 154 through contact 144b operated by coil 131b. Also, coil 131b closes contact 139b and starts the probe motor 19 which raises the probe. When the probe reaches the surface of the water, coil 132c is de-energized cutting out coil 130a and keying coil 133d through the selenium rectifier 134. Contact 140d of coil 133d energizes solenoid valve 146, which is normally closed, to allow the water to drain upon completion of the measurement. Coil 133d is part of a time delay relay which is adjusted for time by resistance and capacity across the coil in order to allow the solenoid to be open long enough to drain that amount of liquid necessary according to the type of the container in use. As stated above, the probe 148 is in the home position at the bottom of the container in contact with the mercury pool 149. When the motor pulls the probe out of the water and coil 132c is de-energized, the voltage from coil 130a is also removed as is the voltage to the windings of motor 19 as well as carrier leads 151. The probe is then allowed to return to the bottom of the container. Motor 19 is a synchronous clock motor described above (FIG. 4). The device shown in FIG. 9 is designed to work at a time interval of 1/10 inch per second in conjunction with the telemetering indicator.

Contact 135c is a normally closed contact operated by coil 132c. Contact 136c is a normally open contact also operated by coil 132c. Passage of voltage to coil 132c is through selenium rectifier 141. It should be noted that the probe motor shaft passes through the wall of container 18 at point 145. At this point, the shaft must be insulated in order to avoid contact with the container since the motor shaft completes the circuit between the probe, which must be insulated from the container 18, and relay coil 132c. The probe is suspended in the container by suspension wire 150 which in this embodiment is made up of stainless steel wire. Condenser 155 is a 500 mf. 150 volt condenser. Condenser 156 is a .1 mf. condenser. It should be noted that the embodiment of FIG. 8 refers to a home position above the water surface while the embodiment of FIG. 9 describes the home position as at the bottom of the container. These definitions of the home position refer in the embodiment of FIG. 8 to a stream water level detector while the embodiment of FIG. 9 refers to a precipitation detector device.

These systems are specifically designed to operate with conventional tone generator equipment and to be transmitted by radio; however, they may be used with wire lines as well. All systems are designed to operate from a power frequency of 60 cycles and using synchronous type motors.

The invention having been described in what is considered to be preferred embodiments thereof, it is to be understood that the specific details shown are merely illustrative and that various embodiments and changes may be made without departing from its spirit and scope.

I claim:

1. A liquid level measuring device for an elapsed time telemetering system comprising an electric probe motor having windings and a shaft; a pulley mounted on said shaft; a probe; elongated elevating, lowering and suspension means for said probe operatively attached on one end to said pulley; means for selectively applying voltage to the windings of said probe motor in order to reverse its operation when said probe contacts water, and means for independently applying D.C. voltage to said windings of said probe motor upon completion of the measuring cycle of said probe motor, to obtain precise time of probe travel for determining liquid level.

2. The liquid level measuring device, for an elapsed time telemetering system, of claim 1 wherein said means for selectively applying line voltage to the windings of the motor in order to reverse its operation when said probe contacts water includes an electron tube with a biased grid from which the bias on said grid is automatically removed when said probe contacts water.

3. A liquid level measuring device for an elapsed time telemetering system comprising an electric probe motor having a shaft and a pulley mounted on said shaft; a probe; elongated elevating, lowering and suspension means for said probe operatively attached on one end to said pulley; automatic control and instant stopping means for said electric probe motor; an open top fluid measuring container having sides, a bottom portion, and support means; insulated mounting means on one of said sides for said probe motor; a depression in said bottom portion having therein a mercury pool so disposed as to be directly under said probe and said pulley of said probe motor, said mercury pool being in an electrical circuit with and a part of said automatic control and instant stopping means.

4. The liquid level measuring device, for an elapsed time telemetering system, of claim 3 further including a solenoid valve in said bottom portion of said measuring container, operated control means for said solenoid valve causing said valve to open upon completion of the measuring movement of said probe.

(References on following page)

References Cited by the Examiner

UNITED STATES PATENTS

| | | | |
|---|---|---|---|
| 2,326,200 | 8/1943 | Bristol | 340—151 |
| 2,748,373 | 8/1956 | Hosmer | 340—151 |
| 2,854,752 | 10/1958 | Heacock | 33—126.6 |
| 2,869,239 | 1/1959 | Jurs et al. | 33—126.6 |
| 2,886,750 | 5/1959 | Vogel | 318—16 |
| 2,922,097 | 1/1960 | Choudhury | 318—212 |
| 3,001,114 | 9/1961 | Hermann et al. | 318—16 |

FOREIGN PATENTS

| | | |
|---|---|---|
| 1,245,182 | 9/1960 | France. |
| 319,684 | 5/1930 | Great Britain. |
| 880,978 | 10/1961 | Great Britain. |

LOUIS R. PRINCE, *Primary Examiner.*

ISAAC LISANN, *Examiner.*

R. T. FROST, J. RENJILIAN, *Assistant Examiners.*